Sept. 4, 1934.  R. E. MILLER ET AL  1,972,747
REMOTE CONTROLLED ELECTROPNEUMATIC BRAKE
Filed April 16, 1932  3 Sheets-Sheet 1
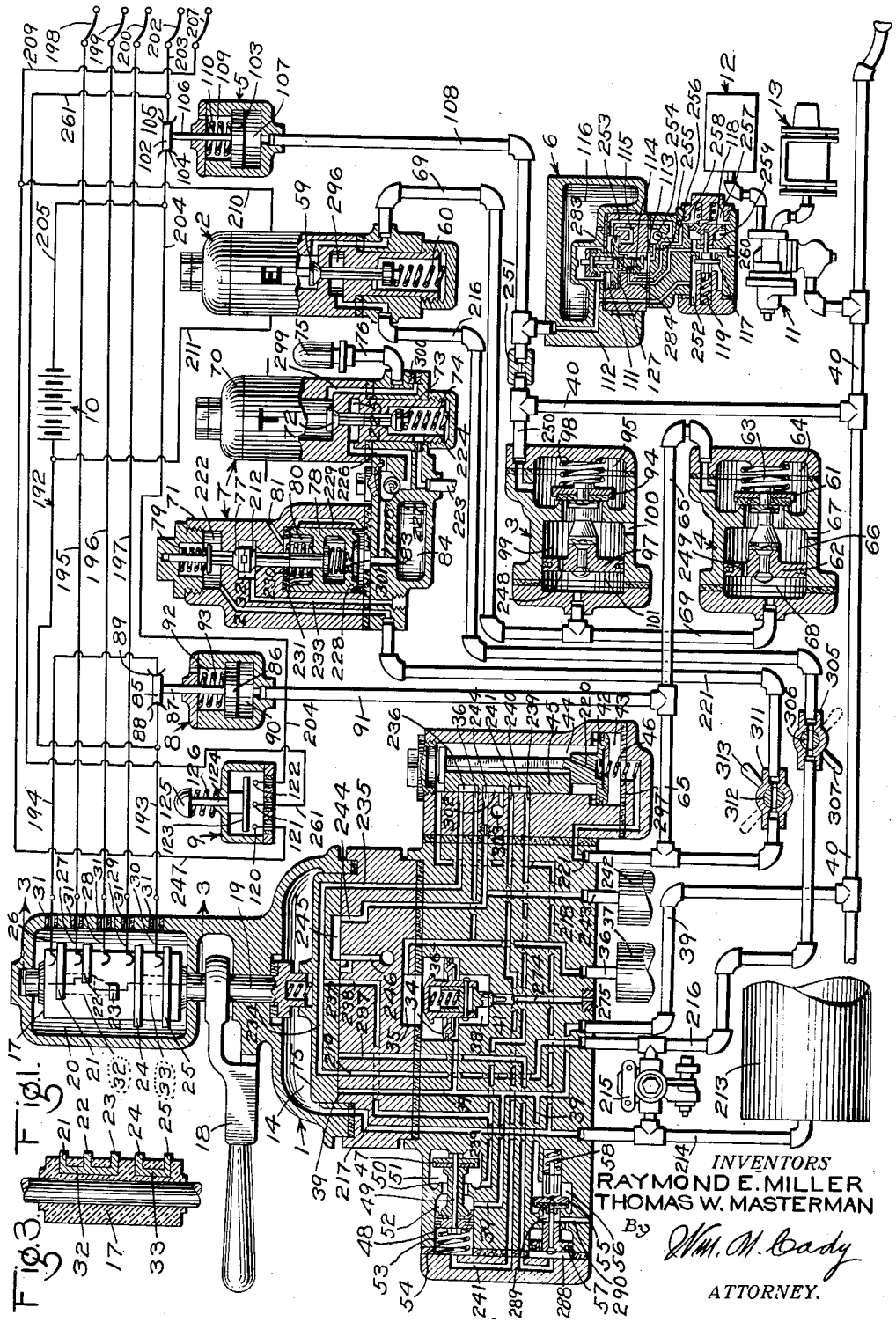
INVENTORS
RAYMOND E. MILLER
THOMAS W. MASTERMAN
By Wm. M. Cady
ATTORNEY.

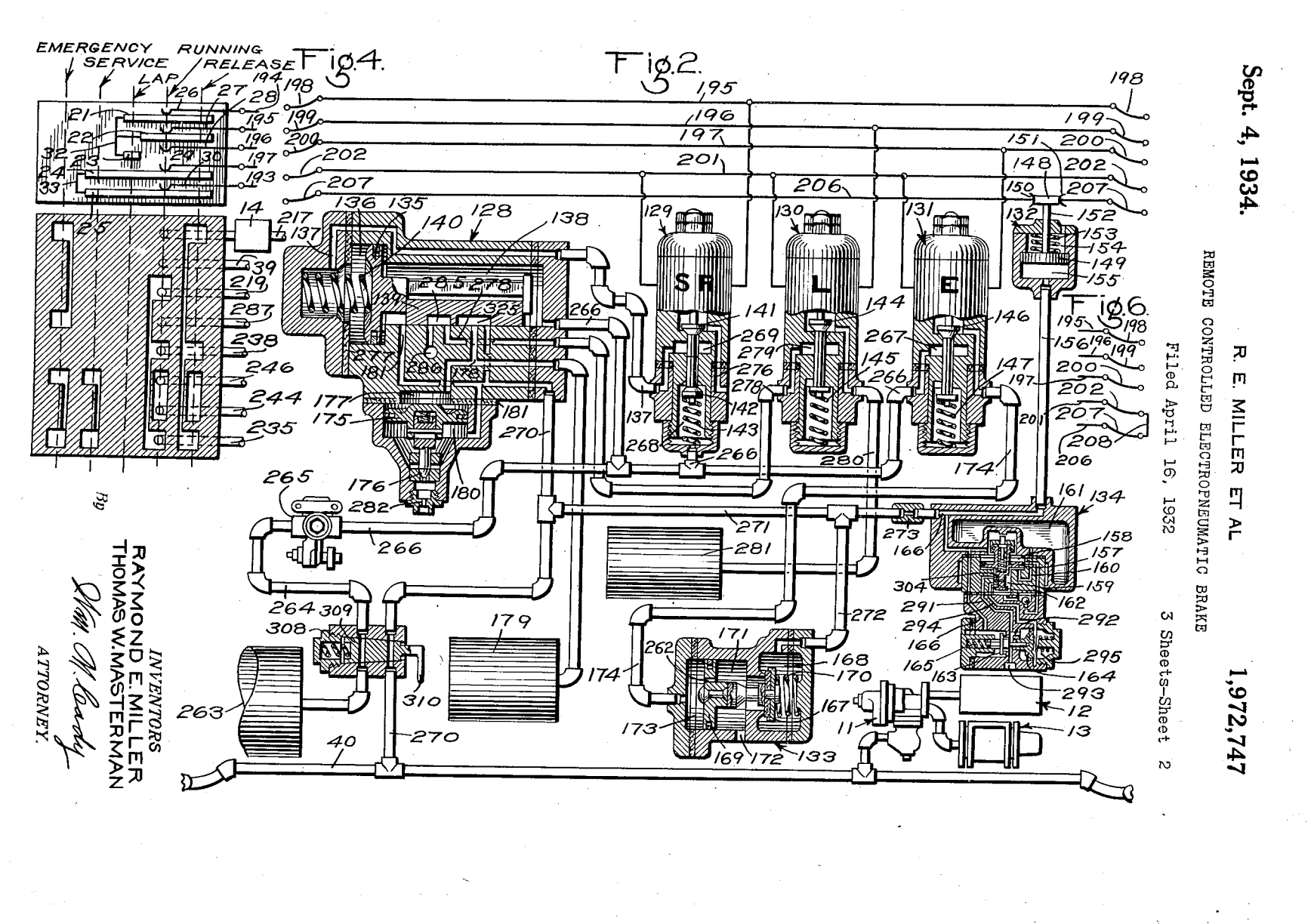

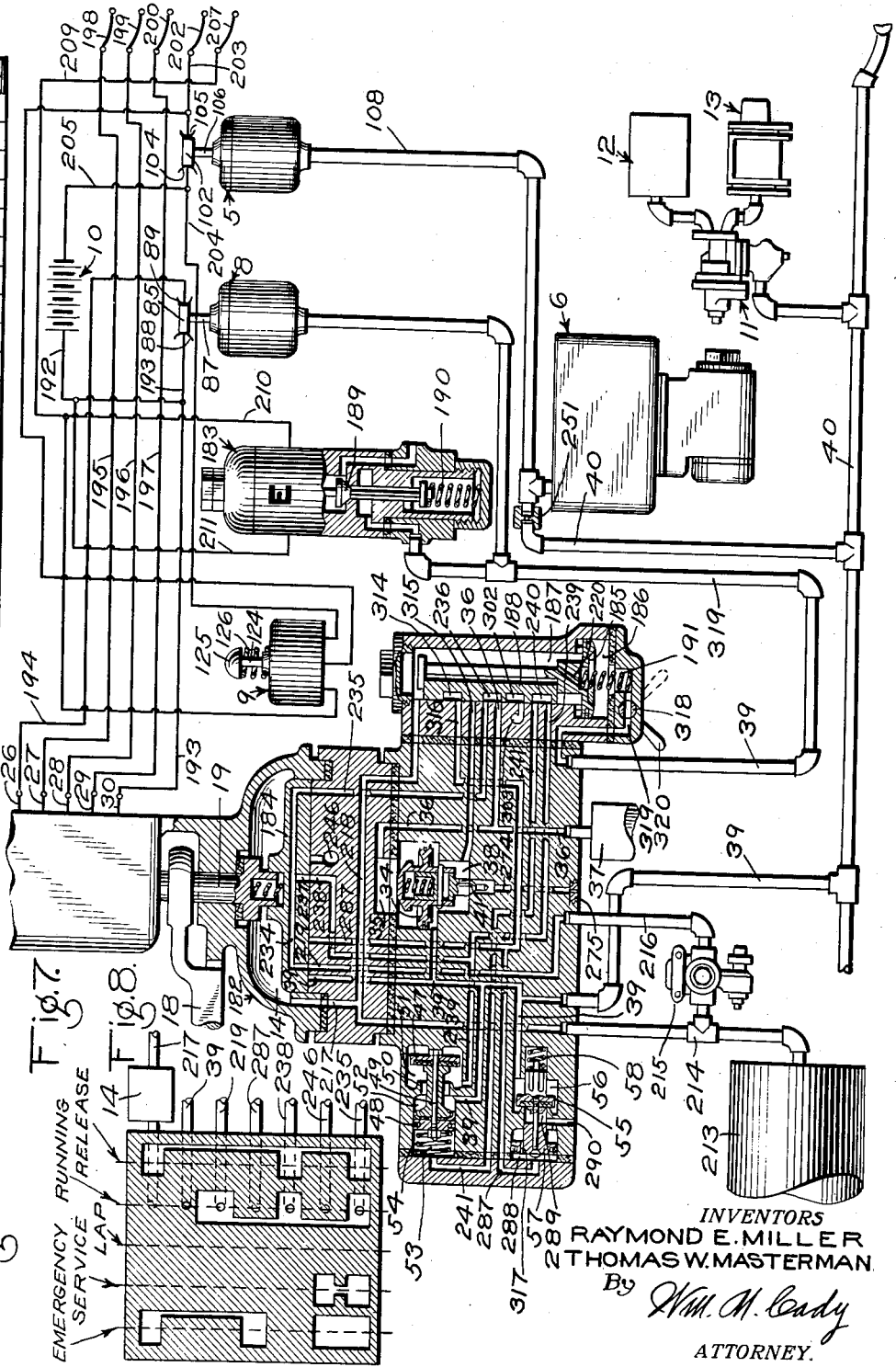

Patented Sept. 4, 1934

1,972,747

UNITED STATES PATENT OFFICE 1,972,747

REMOTE CONTROLLED ELECTRO-PNEUMATIC BRAKE

Raymond E. Miller, Wilkinsburg, and Thomas W. Masterman, East McKeesport, Pa., assignors to The Westinghouse Air Brake Company, Wilmerding, Pa., a corporation of Pennsylvania Application April 16, 1932, Serial No. 605,628

20 Claims. (Cl. 303—20)

This invention relates to train brakes and more particularly to means for varying the pressure of fluid in the brake pipe for controlling the brakes on a train.

In a train equipped with the usual fluid pressure brake apparatus, the brakes are adapted to respond to variations in brake pipe pressure to effect an application and release of the brakes. In order to apply the brakes, the engineer on the locomotive operates the usual brake valve device to vent fluid under pressure from the brake pipe on the train and in order to effect a release of the brakes after an application, the brake valve device is operated to supply fluid under pressure to the brake pipe. It is, therefore, evident that a reduction in brake pipe pressure and an increase in brake pipe pressure is first effective at the front of the train and then becomes effective serially from car to car towards the rear of the train, thereby causing a serial application of the brakes and a serial release of the brakes.

There is a certain amount of slack between the cars of a train which tends to be gathered toward the front of the train when the brakes are serially applied, and tends to permit the front portion of the train to run away from the rear portion in effecting a release of the brakes after an application. In relatively short trains, this change in slack conditions does not materially affect the braking of a train, but in long trains where the amount of slack is great and the time required to obtain an application of the brakes at the rear end of the train is quite long, the gathering of the slack toward the front of the train develops such force as to produce severe and damaging shocks, and especially in view of the fact that there is an ever increasing tendency to operate longer trains, it is becoming correspondingly more difficult to control the train brakes in such a manner as to prevent such shocks.

One object of our invention is to obviate the above condition by providing improved electrically controlled means on one or more cars in the train remote from the locomotive and operative simultaneously with the engineer's brake valve device on the locomotive for varying the pressure of fluid in the brake pipe.

We attain this object by providing at the rear of the train, or at one or more locations in the train, a remote brake controlling unit. This remote unit is electrically controlled from the engineer's brake valve device on the locomotive and is operative in accordance with the operation of said brake valve device to simultaneously vary the brake pipe pressure at the remote unit in accordance with the variations in brake pipe pressure effected at the locomotive by operation of the brake valve device, that is, when the brake valve device is moved to a position for supplying fluid under pressure to the brake pipe, the remote controlling unit will operate at the same time to supply fluid under pressure to the brake pipe from a local source; when the brake valve device is operated to vent fluid under pressure from the brake pipe, the remote unit will at the same time operate to vent fluid under pressure from the brake pipe; and when the brake valve device is moved to lap position, the remote unit will operate at the same time to duplicate this function. By these means, the train may be considered as divided, in effect, into sections or short trains of such length that the slack cannot cause damage to the cars in braking, and each section is simultaneously controlled from a master controller, or in other words, the engineer's brake valve device on the locomotive.

Another object of our invention is to provide electro-responsive means on the locomotive controlled from the one or more remote units in the train for indicating the integrity of an emergency control circuit through the train, said electro-responsive means being operative upon failure of said circuit to cut off the supply of fluid under pressure to the brake pipe and to initiate an emergency reduction in brake pipe pressure at the locomotive and at each of the one or more remote controlling units.

Another object of our invention is to provide electro-responsive means on the locomotive controlled from the one or more remote units in the train and operative upon deenergization to cut off the supply of fluid under pressure to the brake pipe and initiate a sudden reduction in brake pipe pressure at the locomotive, and means carried by the one or more remote units responsive to a sudden reduction in brake pipe pressure for effecting the operation of the electro-responsive means carried by the locomotive.

Another object of our invention is to provide electro-responsive means on each of the one or more remote units operative to locally initiate an emergency reduction in brake pipe pressure, a brake valve device on the locomotive operative in emergency position to effect the operation of said electro-responsive means, and means carried by the locomotive responsive to a sudden reduction in brake pipe pressure for effecting the operation of said electro-responsive means when the brake valve device is in any of the usual positions except emergency position.

Another object of our invention is to provide electrically controlled means on each of the one or more remote units operative upon deenergization to locally initiate an emergency reduction in brake pipe pressure; means carried on the locomotive operative upon deenergization to locally initiate an emergency reduction in brake pipe pressure and to cut off the supply of fluid under pressure to the brake pipe at the locomotive and at each of the one or more remote units; and pressure responsive means carried by each of the one or more remote units operative upon a sudden reduction in brake pipe pressure to effect the deenergization of the means carried by the locomotive.

Another object of our invention is to provide electrically controlled means adapted to be carried by a car in the train and operative simultaneously with the engineer's brake valve device to cut off the supply of fluid under pressure to the brake pipe and to effect a service reduction in brake pipe pressure, traffic controlled means carried on the locomotive and operative upon a change in traffic conditions to effect the operation of the electrically controlled means independently of the brake valve device, and means carried by the locomotive and controlled by traffic conditions for operating simultaneously with the electrically controlled means on the car for cutting off the supply of fluid under pressure to the brake pipe and effecting a service reduction in brake pipe pressure at the locomotive.

Other objects and advantages will be evident from the following, more detailed description of our invention.

In the accompanying drawings; Fig. 1 is a diagrammatic view, mainly in section, of a locomotive brake equipment of a type responsive to changes in traffic conditions and embodying our invention; Fig. 2 is a diagrammatic view of a remote brake controlling unit such as is proposed to be employed on the cabin car at the rear end of the train, or on a special car, several of which may be distributed through the train; Fig. 3 is a sectional view of the switch portion of the brake valve device shown in Fig. 1; Fig. 4 is a development view of the brake valve device and switch shown in Fig. 1 and illustrating diagrammatically the various communications established and electrical contacts made in the various positions of the brake valve device; Fig. 5 is a diagram of a train of cars illustrating the location of the locomotive, the cabin car and possible positions of the special cars, carrying our remote brake controlling unit; Fig. 6 is a view showing the condition of the train wires on the remote brake controlling unit which is rearmost in the train; Fig. 7 is a diagrammatic view of a locomotive brake equipment embodying our invention, but not arranged for control by changes in traffic conditions; and Fig. 8 is a development view of the brake valve device shown in Fig. 7 and illustrating diagrammatically the various communications established in the different positions of the brake valve device.

As shown in Fig. 1, the locomotive brake equipment comprises a brake valve device 1, an emergency magnet device 2, a brake pipe vent valve device 3, a vent valve device 4, an emergency switch device 5, a quick acting valve device 6, train control means 7 governed automatically by traffic conditions, a switch device 8, a reset switch 9, a source of D. C. current such as a storage battery 10, and a fluid pressure brake equipment which, for the purpose of illustration, may be of any type, such for instance as the usual type employed on cars in a train and comprising a triple valve device 11, an auxiliary reservoir 12 and a brake cylinder 13.

The brake valve device 1 comprises a casing having a chamber 14 containing a rotary valve 15 adapted to be turned to various brake controlling positions by means of a handle 18 operatively connected to said rotary valve by means of a shaft 19. The shaft 19 extends into a chamber 20 and secured to said shaft in said chamber is an insulating sleeve or drum 17, which is provided with a plurality of contacts 21, 22, 23, 24 and 25. Said contacts move with the drum 17 and are at various times adapted to engage with respective contact fingers 26, 27, 28, 29 and 30 according to the position which the brake valve device may occupy. The contact fingers 26 through 30 are carried in the casing wall, said fingers being properly insulated from the casing and from each other in any suitable manner, such as by means of insulating bushings 31. As shown in Fig. 3, the contacts are preferably molded in the drum 17, the contacts 21, 22 and 23 being connected together by means of a bridge 32 within the drum, while the contacts 24 and 25 are connected together by means of a bridge 33 within the drum 17.

Preferably associated with the brake valve device is a brake application valve device comprising a piston 42, having at one side a chamber 43 and at the opposite side a valve chamber 44 containing a slide valve 45 adapted to be operated by said piston. A spring 46 is provided in chamber 43 for urging the piston 42 and slide valve 45 to their normal position, as shown in the drawings.

The brake application valve device is adapted at one time to control an equalizing discharge valve mechanism comprising a piston 34 and a brake pipe discharge valve 41 adapted to be operated by said piston. The equalizing piston 34 has at one side a chamber 35 connected through passage and pipe 36 to an equalizing reservoir 37 and at the opposite side a chamber 38 connected through passage and pipe 39 to the brake pipe 40.

A brake pipe cut-off valve device is also adapted to be controlled by the brake application valve device, said cut-off valve device comprising a valve 47 and a piston 48 connected to said valve by means of a stem 49 and adapted to move said valve into engagement with a seat rib 50. The valve 47 is contained in a chamber 51, which is open to a chamber 52 at one side of piston 48 when the valve 47 is not engaging seat rib 50. The piston 48 has at the opposite side a chamber 53 containing a spring 54 acting on said piston for urging said piston and the valve 47 to the position shown in the drawings.

A brake pipe vent valve is provided in the brake valve device and comprises a vent valve 55 contained in a chamber 56 communicating through passage and pipe 39 with a brake pipe 40, and a piston 57 for unseating said vent valve. A spring 58 is provided for seating said vent valve.

The brake application valve device is adapted to be controlled either by the emergency magnet device 2 and vent valve device 4 or by the traffic controlled means 7.

The emergency magnet device 2 comprises a magnet E, a valve 59 adapted to be seated upon energization of said magnet and a spring 60 for unseating said valve upon deenergization of said magnet.

The vent valve device 4 comprises a vent valve 61, a piston 62 for unseating said vent valve and a spring 63 for seating said vent valve. The vent valve 61 is contained in a chamber 64 which is connected to the application valve piston chamber 43 through the medium of a pipe and passage 65. The vent valve piston 62 has at one side a chamber 66 open to the atmosphere through a passage 67 and at the other side a chamber 68 connected to the emergency magnet device 2 by means of a pipe 69.

The traffic controlled means comprises a magnet device 70 and a timing valve device 71 controlled by said magnet device. The magnet device 70 comprises a magnet T and a pair of oppositely disposed valves 72 and 73. Energization of magnet T is adapted to seat valve 72 and unseat valve 73. A spring 74 is provided to seat valve 73 and unseat valve 72 upon deenergization of the magnet T. A signalling device, preferably in the form of a whistle 75, is connected to the magnet device by means of a pipe 76.

The timing valve device 1 comprises a valve 77, a valve 212 abutting valve 77, a valve piston 78 for moving said valves to their upper position shown in the drawings, and a spring 79 for moving said valves in the reverse direction. So far as the invention is concerned, the valve 212 and its stem functions only as a member through which the valve 77 is operated by the valve piston 78. The valve piston 78 has at one side a chamber 80 open to the atmosphere through a passage 81, and at the opposite side a chamber 82 connected through passage 83 to a volume reservoir 84.

The switch device 8 comprises a movable contact member 85, a piston 86 and a piston stem 87 connecting said piston to said contact member and properly insulated from said contact member. The piston 86 is adapted to move said contact member into engagement with a pair of fixed contacts 88 and 89, said piston having at one side a chamber 90 connected by pipe 91 to pipe 65, and at the opposite side a vented chamber 92 containing a spring 93 for operating said piston to move the contact member 85 out of engagement with the fixed contacts 88 and 89.

The vent valve device 3 is connected in line with the vent valve device 4 and hence controlled by the emergency magnet device 2. The vent valve device 3 comprises a vent valve 94 contained in a chamber 95, which is connected through passage and pipe 250 to the brake pipe 40, and a piston 97 for unseating said vent valve, a spring 98 being provided in chamber 95 for urging said vent valve to its seat. The piston 97 has at one side a chamber 99 open to the atmosphere through a passage 100, and at the opposite side a chamber 101 connected to pipe 69.

The switch device 5 comprises a movable contact member 102, a piston 103 for moving said member into engagement with two fixed contacts 104 and 105 and a piston stem 106 operatively connecting said member and piston, said piston stem being properly insulated from said contact member. The piston 103 has at one side a chamber 107 connected through a pipe 108 to the quick acting valve device 6 and at the opposite side a vented chamber 109 containing a spring 110 for urging the contact member 102 out of engagement with the fixed contacts 104 and 105.

The switch device 5 is controlled by the quick acting valve device 6, which comprises a casing containing a piston 127, having at one side a chamber 111 connected through passage 112 to pipe 108, and having at the opposite side a valve chamber 113 containing a slide valve 114 adapted to be operated by said piston, the valve chamber 113 being connected through a passage 115 to a volume chamber 116 formed in the casing. The quick acting valve device further comprises a vent valve device consisting of a vent valve 117, a piston 118 for unseating said vent valve and a spring 119 for seating said vent valve.

The reset switch device 9 comprises a casing carrying three fixed contacts 120, 121 and 122 properly insulated from the casing and from each other. A movable contact member 123 is insulated from and carried on one end of a stem 124 and is movable into engagement with the fixed contacts 120, 121 and 122. The end of the stem 124 is provided with a button 125 by means of which an operator is adapted to manually move the contact 123 into engagement with the contacts 120, 121 and 122. A spring 126 is interposed between the button and casing for urging the contact 123 out of engagement with contacts 120, 121 and 122.

The triple valve device 11 is adapted to operate in accordance with variations in pressure in the brake pipe 40 for controlling the supply of fluid under pressure from the brake pipe 40 to the auxiliary reservoir 12, the supply of fluid under pressure from the auxiliary reservoir 12 to the brake cylinder 13 and the release of fluid under pressure from the brake cylinder, in the usual, well known manner. As the operation of these parts of the brake equipment are so well known it is deemed unnecessary to provide further description of the structure or function in the specification.

The remote brake controlling unit shown in Fig. 2, comprises a service application and release valve device 128, a service application and release magnet valve device 129 for controlling the operation of the device 128, a lap magnet valve device 130 for controlling the degree of brake application in effecting a graduated application of the brakes, an emergency magnet valve device 131, an emergency switch device 132, a brake pipe vent valve device 133 and a quick acting valve device 134.

The service application and release valve device 128 comprises a piston 135 having a chamber 136 at one side connected through a passage and pipe 137 to the magnet valve device 129, and a valve chamber 138 at the opposite side containing a slide valve 139 adapted to be operated by said piston. A spring 140 is provided in piston chamber 136 and acts on the piston 135 for urging said piston and the slide valve 139 to their release position shown in the drawings. This device also contains the usual equalizing discharge valve mechanism comprising an equalizing piston 175 and a brake pipe discharge valve 176 adapted to be operated by said piston. The equalizing piston 175 has at one side a chamber 177 connected through passage and pipe 178 to an equalizing reservoir 179 and at the opposite side a chamber 180 connected through passage 181 and pipe 270 to the brake pipe 40.

The service application and release magnet valve device 129 comprises a magnet SR, a pair of oppositely disposed valves 141 and 142 and a spring 143 acting on the valve 142. Energization of the magnet SR is adapted to seat valve 141 and unseat valve 142, while upon deenergization of said magnet, spring 143 is adapted to seat valve 142 and unseat valve 141.

The lap magnet valve device 130 comprises a magnet L, a valve 144 adapted to be seated upon energization of said magnet, and a spring 145 for unseating said valve when the magnet L is deenergized.

The emergency magnet valve device 131 comprises a magnet E, a valve 146 adapted to be seated upon energization of said magnet, and a spring 147 for unseating said valve when the magnet E is deenergized.

The emergency switch device 132 comprises a movable contact 148, a piston 149 for moving said contact into engagement with two fixed contacts 150 and 151, a stem 152 operatively connecting piston 149 to contact 148 and properly insulated from said contact, and a spring 153 acting on the piston 149 for urging the contact 148 out of engagement with contacts 150 and 151. The piston 149 has at one side a vented chamber 154 containing the spring 153, and at the opposite side a chamber 155 connected by means of a pipe 156 to the quick acting valve device 134.

The quick acting valve device 134 comprises a casing containing a piston 157, having at one side a chamber 158 connected to passage 166, and having at the opposite side a valve chamber 159 connected through a passage 160 to a volume reservoir 161 and containing a slide valve 162 adapted to be operated by said piston. The valve device 134 further comprises a vent valve mechanism consisting of a vent valve 163, a piston 164 for unseating said vent valve and a spring 165 for urging said vent valve to its seat.

The vent valve device 133 comprises a vent valve 167 contained in a chamber 168, and a piston 169 for unseating said vent valve, a spring 170 being provided in chamber 168 for urging said vent valve to its seat. The piston 169 has at one side a chamber 171 connected to the atmosphere through a passage 172 and at the opposite side a chamber 173 connected to the emergency magnet valve device 131 by means of a pipe 174.

The remote brake controlling unit may also include, for the purpose of illustration, a triple valve device 11, auxiliary reservoir 12 and a brake cylinder 13, the same as employed on the locomotive shown in Fig. 1.

The locomotive brake equipment shown in Fig. 7 is very similar to that shown in Fig. 1, except for the fact that it is not adapted to be controlled by traffic conditions. This equipment comprises a brake valve device 182 and an emergency magnet valve device 183, which differ from those shown in Fig. 1. The equipment further comprises the switch device 5, the quick acting valve device 6, the switch device 8, reset switch device 9, the electric battery 10, the triple valve device 11, auxiliary reservoir 12 and brake cylinder 13, which are the same as those shown in Fig. 1.

In the brake valve device 182, the electric contact portion equalizing discharge valve mechanism, brake pipe cut-off valve device and brake pipe vent valve device are the same as those described in connection with Fig. 1, but the rotary valve 184 in chamber 14 and the brake application valve device differ from those shown in Fig. 1.

The brake application valve device comprises a piston 185 having a chamber 186 at one side and a valve chamber 187 at the opposite side containing a slide valve 188 adapted to be operated by said piston. A spring 191 is provided in chamber 186 for urging the piston 185 and slide valve 188 to their normal position shown in the drawings.

The operation of the brake application valve device is controlled directly by the emergency magnet valve device 183 which comprises a magnet E, a valve 189 adapted to be seated upon energization of said magnet and a spring 190 for unseating said valve upon deenergization of said magnet.

Now referring again to Fig. 1, it will be noted that the battery 10 is connected through wires 192 and 193 to the contact finger 30 in the brake valve device 1 and from wire 193 through switch contacts 88, 85 and 89, when said switch contacts are closed as will be hereinafter described, to a wire 194 connecting to finger 26 in the brake valve device 1. The finger 27 in the brake valve device is connected to a wire 195, the finger 28 is connected to a wire 196, and the finger 29 is connected to a wire 197. The wires 195, 196 and 197 extend to the end of the locomotive and there are connected by suitable couplings 198, 199 and 200 to corresponding wires which in turn are connected by like couplings between cars and extend through the train so that the remote controlling unit or units in the train are serially connected in such a manner that wire 195 is connected to magnet SR on each remote unit, wire 196 is connected to magnet L on each remote unit and wire 197 is connected to magnet E on each remote unit. Each of these magnets is connected to a common return wire 201, which is connected by suitable couplings 202 to a wire 203 on the locomotive, the wire 203 being adapted to be connected through contacts 105, 102 and 104 of the switch device 5 and wires 204 and 205 to the battery 10.

The train is provided with a fifth wire 206 running through its length and properly coupled between cars by couplings 207. The emergency switch contact 148 on the remote unit or units is connected into wire 206 and on the remote unit which is rearmost in the train or at the rear end of the train, the wire 206 is connected to the return wire 201 by means of a suitable connector 208 connecting the couplings 202 and 207. On the locomotive, the wire 206 is connected through couplings 207 and wires 209 and 210 to one side of the E magnet, the other side of said magnet being connected through wires 211 and 192 to battery 10.

In order to simplify the description of operation, which will immediately follow, it will be assumed that the remote brake controlling unit is only employed on the cabin car which is generally the rearmost vehicle in the train. Hence, the fifth wire 206 and the return wire 201 will be connected by the connector 208 at the rear end of the cabin car.

In operation, fluid under pressure is supplied to a main reservoir 213 on the locomotive and flows from said main reservoir through pipe 214 and passage 217 to the rotary valve chamber 14 in the brake valve device and from passage 217 through passage 218 to the valve chamber 44 of the brake application valve device.

Fluid from the main reservoir pipe 214 is also supplied to a feed valve device 215 which may be of the usual construction and operative to reduce the pressure of fluid carried in the main reservoir to the pressure desired to be carried in the brake pipe 40. Said feed valve device operates to supply fluid at the reduced pressure to pipe 216 leading to the emergency magnet valve device 2 and to the brake valve device 1 from whence it flows through passage 219 to the seat of the rotary valve 15.

Fluid at main reservoir pressure supplied to valve chamber 14 of the brake application valve device flows through a port 220 in piston 42 to chamber 43 and from thence through passage and pipe 221 to chamber 222 in the timing valve portion of the traffic controlled means 7.

Assume the traffic controlled magnet T to be energized, the magnet controlled valve 72 is, as a result, seated and the valve 73 is unseated. A pipe 223 is connected to any suitable source of fluid under pressure, and fluid supplied to said pipe flows to valve chamber 224, thence past valve 73 to chamber 225 and from chamber 225 through passage 226, past a check valve 227 and through passage 83 to chamber 82 at the lower side of valve piston 78 and at the same time to the volume reservoir 84. The pressure in chamber 82 acts on the valve piston 78 within a sealing rib 228, the seated area outside of rib 228 being vented to the atmosphere through a passage 229, the chamber 80 and atmospheric passage 81.

When the pressure acting in chamber 82 within the seat rib 228 is built up sufficiently to overcome the opposing pressure of a control spring 230, said valve piston is moved upwardly, the initial movement thereof exposing the full area of said valve piston to the pressure in chamber 82, thereby causing said valve piston to promptly move to its upper position and seal on a gasket 231.

The upward movement of valve piston 78 seats valve 77 so as to close communication from chamber 222 to chamber 232 which is vented through passage 233.

With the timing valve 77 seated, fluid supplied through port 220 in the brake application valve piston 42 builds up a pressure in chamber 43, passage and pipe 221 and chamber 222 in the timing valve device equal to the pressure in the brake application valve chamber 44, which permits spring 46 to hold the piston 42 and valve 45 in the normal position shown in the drawings. Fluid from pipe 221 flows through pipe 65 to the vent valve chamber 64 and from pipe 65 through pipe 91 to chamber 90 in the switch device 8. Fluid thus supplied to chamber 90 moves the piston 86 and contact 85 to their normal position shown in the drawings, in which position contact 85 connects contacts 88 and 89.

Assume the brake valve device 1 to be in running position. In this position, fluid at feed valve pressure flows from passage 219 through port 234 in the rotary valve 15 to passage 235 and from thence through cavity 236 in the brake application slide valve 45 and passage 36 to the equalizing discharge valve piston chamber 35 and to the equalizing reservoir 37.

Fluid at feed valve pressure also flows from port 234 in rotary valve 15 through port 237 and passages 238 and 239 to the cut-off valve chamber 51 and to the seat of the brake application slide valve 45. From passage 239 fluid flows through a cavity 240 in said slide valve to passage 241 and from thence to the cut-off valve piston chamber 53 thereby equalizing the opposing fluid pressures acting on the cut-off valve 47 and cut-off valve piston 48, whereupon spring 54 moves said piston and valve to the position shown in the drawings in which fluid at feed valve pressure is permitted to flow from the cut-off valve chamber 51 to chamber 52 and from thence through passage and pipe 39 to the equalizing discharge valve piston chamber 38, the brake pipe vent valve chamber 56 and to the brake pipe 40, thereby charging said chambers and the brake pipe to the pressure supplied by the feed valve device. Since the equalizing piston chamber 35 is also charged with fluid at feed valve pressure, the opposing pressures acting on the piston 34 are substantially equal and said piston maintains the brake pipe discharge valve 41 seated in the usual well known manner.

With the brake valve device in running position, a reduction limiting reservoir 242 is vented to the atmosphere through a pipe and passage 243, passage 244, cavity 245 in the rotary valve 15 and an atmospheric passage 246.

In order that the brake application valve device will operate as above described to permit charging of the brake pipe 40, it is necessary that the reset switch 9 be depressed so as to connect contacts 120 and 122 through which the emergency magnet E on the locomotive is placed in circuit with the battery 10, the circuit being established through wires 205, 204, reset switch contacts 122, 123 and 120, wires 247 and 210, magnet E and wires 211 and 192 to battery 10. Magnet E on the locomotive is thus energized and operates to seat valve 59, which permits the vent valve piston chambers 101 and 68 and the pipe 69 to be vented through a port 248 in the vent valve piston 97, chamber 99 and atmospheric passage 100 and also through port 249 in the vent valve piston 62, chamber 66 and atmospheric passage 67, and this permits the vent valves 94 and 61 to be seated by their respective springs 98 and 63. With the vent valve 94 seated, chamber 95 is charged with fluid under pressure from the brake pipe 40 through pipe and passage 250 and with the vent valve 61 seated, the vent valve chamber 64 is charged with fluid under pressure from the brake application valve piston chamber 43 by way of pipe and passage 221, and pipe 65. It will now be evident that the reset switch device 9 must be depressed in order that the vent valves 98 and 63 will be seated so as to permit operation of the brake application valve and charging of the brake pipe 40 in the manner hereinbefore described.

Fluid under pressure flows from the brake pipe 40 through a choked coupling 251 to pipe 108 leading to piston chamber 107 of the switch device 5. From pipe 108 fluid flows through passage 112 to vent valve chamber 252 and piston chamber 111 in the quick acting valve device 6. With the piston 127 in the normal position, shown in the drawings, fluid flows from chamber 111 through passage 253, past check valve 254 and through passage 255 to valve chamber 113 and from thence through passage 115 to the volume chamber 116, thereby charging valve chamber 113 and volume chamber 116 to brake pipe pressure.

With the vent valve piston 127 and slide valve 114 in the normal position shown in the drawings, passage 256 leading to the vent valve piston chamber 257 is lapped, and chamber 257 being vented through a port 258 in piston 118 to a chamber 259 which is open to the atmosphere through a passage 260, permits spring 119 to maintain the vent valve 117 seated.

When the pressure in piston chamber 107 of the switch device 5 is built up to a predetermined degree, the opposing pressure of spring 110 on piston 103 is overcome and said piston operates to move contact 102 into engagement with contacts 104 and 105.

The remote unit shown in Fig. 2 is adapted to operate to supply fluid under pressure to the brake pipe 40 at the rear end of the train at the same time as the locomotive apparatus operates to supply fluid under pressure to the brake pipe 40 at the front end of the train.

When the switch device 8 on the locomotive is operated by fluid from the brake application valve device, the wire 192 from battery 10 is connected to wire 194 leading to contact finger 26 in the brake valve device. With the brake valve device in running position, finger 26 is connected through contact 21, bridge 32 and contact 22 to finger 27 to which is connected the train wire 195 leading back through the train to one terminal of magnet SR on the remote unit. The other terminal of magnet SR is connected to the return wire 201 which is connected to wire 203 on the locomotive. Wire 203 is connected by wire 261 to contact 121 in the reset switch device 9, the contact 121 being in turn connected through contacts 123, 122 and wire 204 to battery 10. A circuit is thereby closed through magnet SR on the remote unit and said magnet is energized and operates to seat valve 141 and unseat valve 142.

At the same time as magnet SR on the remote unit is energized, the emergency magnet E on the remote unit is also energized, the circuit through magnet E on the remote unit being established from battery 10 through wires 192 and 193, contact finger 30 in the brake valve device, contact 25, bridge 33, contact 24, finger 29 and emergency magnet wire 197 which runs through the train to one terminal of the magnet E on the remote unit, the other terminal of magnet E being connected to return wire 201 which is connected back through the reset switch 9 on the locomotive to battery 10 as above described. Magnet E being thus energized, valve 146 is seated, so that pipe 174 and the vent valve piston chamber 173 are vented to the atmosphere through port 262 in piston 169, chamber 171 and atmospheric passage 172. With chamber 173 vented, spring 170 maintains the vent valve 167 seated.

The remote unit is provided with a main reservoir 263 and means (not shown) for supplying fluid under pressure to said main reservoir. Fluid flows from said main reservoir through a pipe 264 to a feed valve device 265 which operates in the usual manner to reduce the pressure of fluid in the main reservoir 263 to that desired to be carried in the brake pipe 40 and supply fluid at the reduced pressure to a pipe 266.

Fluid at feed valve pressure thus supplied to pipe 266 flows to chamber 267 in the emergency magnet valve device 131, to chamber 268 in the magnet valve device 129 and to valve chamber 138 of the service application and release valve device 128.

The emergency magnet valve 146 being seated by energization of magnet E prevents flow of fluid from chamber 267. The valve 142 being unseated upon the energization of magnet SR permits fluid to flow from chamber 268 to chamber 269 and from thence through passage and pipe 137 to piston chamber 136 of the valve device 128. Fluid at the pressure supplied by the feed valve device 265 is thus supplied directly to valve chamber 138 and past the magnet opened valve 142 to piston chamber 136. The opposing fluid pressures acting on piston 135 being thus equal, spring 140 is permitted to maintain the piston 135 and slide valve 139 in the release position shown in the drawings.

With the slide valve 139 in the release position, the passage 181 in the slide valve seat is open to valve chamber 138 past the end of said slide valve, so that fluid supplied by the feed valve device to valve chamber 138 is permitted to flow to passage 181 and from thence through pipe 270 to the brake pipe 40 thus charging said brake pipe from the rear end of the train.

From passage 181, fluid flows to the equalizing discharge valve piston chamber 180 and also through cavity 271 to passage 178 leading to the equalizing discharge valve piston chamber 177 and equalizing reservoir 179. The equalizing piston 175 is thus subject on both sides to feed valve pressure and operates to hold the discharge valve 176 seated in the usual well known manner.

Fluid supplied to pipe 270 flows through pipes 271 and 272 to the vent valve chamber 168 and from pipe 271 through a choked coupling 273 to passage 166 in the quick acting valve device 134, the valve chamber 159 and volume reservoir 161 of said device being charged to brake pipe pressure in the same manner as with the corresponding device 6 on the locomotive. From passage 166 fluid flows through pipe 156 to chamber 155 in the emergency switch device 132 and when a predetermined pressure is obtained in said chamber, the piston 149 is operated to move the contact 148 into engagement with contacts 150 and 151.

The brake pipe on the train is thus charged from both ends with fluid at the pressure supplied by the feed valve device 215 on the locomotive and the feed valve device 265 on the remote unit, the adjustment of both of said feed valves being the same.

When the switch device 5 on the locomotive operates to connect contacts 104 and 105, the return wires 201, 203 are connected directly to battery 10, so that the circuit through the SR and E magnets on the remote unit need no longer be closed through the reset switch device 9. The operation of the switch device 5 does not effect the circuit through the magnet E on the locomotive however, and in order to prevent deenergization of said magnet, the reset switch must be maintained depressed until the switch device 132 on the remote unit operates to connect contacts 150 and 151 and thus connect terminal 210 of the E magnet on the locomotive to the rear of the train by way of wires 210 and 209, couplings 207 and wire 206. Wire 206 being connected to return wire 201 through the medium of the connector 208 at the rear end of the remote unit, and the return wire 201 being connected directly to the battery 10 after operation of the switch device 5 on the locomotive, a circuit is closed through the E magnet on the locomotive, which circuit is independent of the reset switch device 9. After the circuit just described is closed through the E magnet on the locomotive, the reset switch may be relieved of manual pressure upon which, spring 126 moves contact 123 out of engagement with contacts 120, 121 and 122.

Now, if the engineer desires to make a gradual reduction in brake pipe pressure to effect a service application of the brakes, he turns the brake valve device from running position to service position, in which position passage 233 is lapped by the rotary valve 15 to prevent further flow of fluid under pressure to the brake pipe. Passage 235, which communicates through the brake application valve device with the equalizing discharge valve piston chamber 35 and equalizing reservoir 36, is connected through the rotary valve 15 to the atmospheric passage 246, so that fluid under pressure is permitted to flow from said chamber and reservoir to the atmosphere and thus reduce the pressure of fluid acting in said chamber. The higher brake pipe pressure acting in chamber 38 then shifts the piston 34 upwardly and unseats the brake pipe discharge valve 41 past which fluid under pressure is permitted to flow from brake pipe 40 to the atmosphere by way of pipe and passage 39, discharge valve chamber 38, past the discharge valve 41 to passage 274 and from thence to the atmosphere through a choke plug 275 having an orifice of the usual flow area to control the rate of reduction in brake pipe pressure.

In service position of the brake valve device, the contact 22 is moved out of engagement with contact finger 27, thereby cutting off the current supply to train wire 195 and consequently magnet SR on the remote unit. Magnet SR thus becomes deenergized, which permits spring 143 to seat valve 142 so as to cut off the supply of fluid to piston chamber 136 of the service application and release valve device 128. The valve 141 is unseated by the seating movement of valve 142, thereby opening communication through which fluid is vented from piston chamber 136 to the atmosphere, i. e. by way of passage and pipe 137, chamber 269 in the magnet valve device 129, past valve 141 and through an atmospheric passage 276.

Upon the venting of fluid under pressure from the piston chamber 136 of the service application and release valve device, the pressure in chamber 138 moves the piston 135 and slide valve 139 leftwardly to application position in which position piston 135 engages a gasket 277.

In application position of slide valve 139, passage 181 is lapped by said slide valve, so as to prevent further flow of fluid at feed valve pressure from valve chamber 138 to the brake pipe and at the same time fluid is vented from the equalizing discharge valve piston chamber 177 and connected equalizing reservoir 179 through passage 178 and cavity 325 in the slide valve 139 to a passage and pipe 278 leading to chamber 279 in the magnet valve device 130.

Contact finger 28 in the brake valve device is connected to contact 23 in the brake valve device only in lap position of the brake valve device, which will hereinafter be described, so that in service position of the brake valve device, no electrical energy is supplied through said finger and the connected train wire 196 to magnet L on the remote unit. As a result, magnet L is deenergized and spring 145 holds the valve 144 unseated, which permits fluid vented from the equalizing discharge valve piston chamber 177 and equalizing reservoir 179 to chamber 279 in the magnet valve device 130 to flow past valve 144 and from thence through passage and pipe 280 to a reduction limiting reservoir 281.

Upon reducing the pressure in the equalizing discharge valve piston chamber 177, the higher brake pipe pressure in chamber 180 operates the piston 174 to unseat the discharge valve 176, which permits fluid under pressure to flow from the brake pipe 40 to the atmosphere by way of pipe 270, passage 181, equalizing piston chamber 180, past the discharge valve 176 and through a choke passage 282.

It will be evident that since magnet SR is deenergized immediately upon movement of the brake valve device to service position, the service application and release valve device 128 will promptly operate to effect a service reduction in brake pipe pressure at the rear end of the train at substantially the same time as the service reduction in brake pipe pressure is effected at the front end of the train by operation of the brake valve device, the advantage gained in using the remote unit in conjunction with the brake valve device being that the time required to effect a service reduction in brake pipe pressure is reduced to about 50% of that which would be required if the reduction in brake pipe pressure had to be entirely effected through the brake valve device on the locomotive, and due to the fact that the brakes are applied from the rear of the train at the same time as from the front of the train, the slack in the train is so controlled as to prevent harsh shocks.

A full service reduction in brake pipe pressure may be effected, or the degree of reduction may be limited to any desired amount less than a full service. In either case, when the desired degree of brake pipe reduction is obtained, the brake valve device is turned from service position to lap position in which passage 235, communicating with the equalizing reservoir 37 and equalizing discharge valve piston chamber 35, is lapped by the rotary valve 15 so as to prevent further reduction in pressure in said reservoir and chamber. The brake pipe pressure acting on the opposite side of the equalizing piston 34 then continues to reduce past the unseated discharge valve 41 until said pressure is slightly below the opposing pressure in chamber 35 at which time the equalizing piston 34 operates in the usual manner to seat the discharge valve 41 and prevent further flow of fluid under pressure from the brake pipe.

In lap position of the brake valve device, the movable contact 23 engages the finger 28 which is connected through train wire 196 to magnet L on the remote unit, the other terminal of magnet L being connected through the return wire 201 and switch device 5 on the locomotive to one terminal of battery 10. In the brake valve device, contact 23 is connected through bridge 32 to contact 21 which is connected through finger 26, wire 194, switch device 8 and wire 192 to the other terminal of battery 10. Thus, when the brake valve device is moved to lap position, a circuit is closed through magnet L on the remote unit, thereby energizing said magnet. The energization of magnet L seats valve 144, so as to prevent further venting of fluid from the equalizing discharge valve piston chamber 177 and the connected equalizing reservoir 179. Fluid continues to be vented from the brake pipe 40 past the discharge valve 176 however, until the brake pipe pressure acting in piston chamber 180 is reduced to slightly below the pressure in chamber 177, at which time the piston 175 is operated to seat the discharge valve 176 in the usual manner.

The reduction in brake pipe pressure may be effected in steps if desired, by moving the brake valve device first to service position, then to lap position and repeat. Magnet L on the remote unit will operate simultaneously with the movement of the brake valve device and permit a reduction in brake pipe pressure to be effected at the rear end of the train in steps equal in amount to the steps of reduction effected by operation of the brake valve device at the head end of the train.

The reduction in equalizing reservoir pressure on the remote unit is limited to equalization with the reduction reservoir 281, which, however, is of such volume as to permit a full service reduction in brake pipe pressure. The use of said reservoir is not so necessary when the brake pipe pressure is reduced by the operation of the brake valve device by the engineer as above described, but said reservoir is desirable when the brake pipe pressure is automatically reduced by a change in traffic conditions, as will be hereinafter described.

As the brake pipe pressure is reduced at a service rate, fluid flows back from piston chamber 111 of the quick acting valve device 6 to the brake pipe through passage 112, pipe 108 and choke fitting 251. The higher pressure in valve chamber 113 then shifts the piston 127 and slide valve 114 upwardly until a port 283 registers with passage 284 which is open to the atmosphere through passage 260. In this position, fluid is vented from valve chamber 113 and the connected volume reservoir 116 at a rate corresponding to the service rate of reduction in brake pipe pressure in piston chamber 111 and the movement of the piston 127 and slide valve 114 therefore ceases. Then when the pressure in valve chamber 113 is reduced to slightly below the brake pipe pressure acting in chamber 111, the piston 127 is operated to return the slide valve 114 to the normal position shown in the drawings.

The quick acting valve device 134 on the remote unit operates the same as the corresponding device on the locomotive when a service reduction in brake pipe pressure is effected.

The switch device 5 on the locomotive and the switch device 132 on the remote unit are both subject to brake pipe pressure but these devices are so designed that a relatively small degree of pressure will maintain them in their circuit closing position, said pressure being for instance twenty-five or thirty pounds or below that to which the brake pipe pressure is reduced in effecting a full service or over reduction in brake pipe pressure.

If it is desired to charge the brake pipe 40 to effect a release of the brakes after a service application, the brake valve is turned first to release position and then to running position. In release position fluid at main reservoir pressure is supplied directly from valve chamber 14 to passage 238 and from thence through the cut-off valve chamber 51, chamber 52 and through passage 39 to brake pipe 40. This supply of fluid at high pressure to the brake pipe accelerates the increase in brake pipe pressure and after the brake valve device has been in release position for a certain period of time, during which the brake pipe at the head end of the train is charged to substantially main reservoir pressure, the brake valve device is turned to running position in which the supply of fluid to the brake pipe is governed by the feed valve device 215. As the brake pipe pressure is thus increased, fluid at feed valve pressure is also supplied to the equalizing discharge valve piston chamber 35 and to the equalizing reservoir 37 in the same manner as hereinbefore described.

In the release position of the brake valve device, contact fingers 26 and 27 engage contacts 21 and 22 the same as when the brake valve device is in running position, as described in connection with the initial charging of the brake equipment. As a result the magnet SR on the remote unit is energized and supplies fluid from the feed valve device 265 to piston chamber 136 of the service application and release valve device 128, which permits the piston 135 and slide valve 139 to be returned to their release position by spring 140. In the release position of slide valve 139 fluid is supplied from feed valve device 215 to brake pipe 40, equalizing discharge valve piston chamber 177 and equalizing reservoir 179 in the same manner as in initially charging the brake equipment.

When the brake valve device is in release or running position, finger 28 does not engage contact 23 so the circuit is opened through train wire 196 which connects to magnet L on the remote unit. As a result, magnet L is deenergized when the brake valve is in release and running position, which permits spring 145 to unseat valve 144 and vent the reduction limiting reservoir 281 to the atmosphere by way of pipe 280, past valve 144, through chamber 279, pipe and passage 278, cavity 285 in slide valve 139 of the service application and release valve device 128 and atmospheric passage 286.

In charging the brake pipe, the valve chamber 113 and volume reservoir 116 of the quick acting valve device 6 on the locomotive and the corresponding chamber and reservoir in the quick acting valve device 134 on the remote unit are charged to brake pipe pressure as hereinbefore described.

If the engineer desires to effect an emergency application of the brakes, he turns the brake valve device to emergency position in which passage 238 is lapped so as to cut off the supply of fluid under pressure to the brake pipe and fluid at main reservoir pressure is supplied from valve chamber 14 to passage 287 leading to chamber 288 at one side of the vent valve piston 57. The piston 57 is thereby operated to unseat the vent valve 55, which permits fluid under pressure to rapidly flow from brake pipe 40 through pipe and passage 39, vent valve chamber 56, past the vent valve 55 to chamber 289 and from thence to the atmosphere through passage 290. This rapid venting of fluid from the brake pipe at the locomotive initiates an emergency wave of reduction in brake pipe pressure, which is adapted to be transmitted serially from car to car toward the rear of the train in the usual manner.

When the brake valve device is moved to emergency position, magnet SR on the remote unit is deenergized and causes the service application and release valve device 128 to operate to cut off the supply of fluid under pressure to the brake pipe in the same manner as when a service application of the brakes is effected. Also in emergency position of the brake valve device the circuit through magnet E on the remote unit is opened because contacts 24 and 25 in the brake valve device are moved out of engagement with fingers 29 and 30, the finger 29 being connected to the emergency magnet wire 197. Magnet E on the remote unit is thus deenergized, permitting spring 147 to unseat valve 146 and supply fluid at feed valve pressure from the feed valve pipe 266 through chamber 267, past valve 146 and through pipe 174 to the vent valve piston chamber 173. Piston 169 is operated by the fluid supplied to chamber 173 to unseat the vent valve 167 so as to rapidly vent fluid under pressure from the brake pipe 40 by way of pipes 270, 271 and 272, vent valve chamber 168, past the vent valve 167 to chamber 171 and from thence to the atmosphere through passage 172. This rapid venting of fluid from the brake pipe on the remote unit initiates an emergency wave of reduction, which is adapted to be transmitted serially from the remote unit forwardly in the train and since it is initiated simultaneously with the initiation of the emergency reduction at the locomotive, the brakes at the front and rear of the train will apply at the same time and the brakes will apply serially from the two ends of the train toward the middle of the train.

The sudden venting of fluid from the brake pipe 40 on the remote unit causes an emergency reduction in pressure to be effected in the piston chamber 158 of the quick acting valve device 134. This permits the pressure in valve chamber 159 to move the piston 157 and slide valve 162 upwardly. Port 304 through said slide valve is of insufficient capacity to reduce the pressure in valve chamber 159 as fast as the brake pipe pressure reduces in piston chamber 158 in effecting an emergency application of the brakes and as a result, the piston 157 and slide valve 162 do not cease moving as when effecting a service reduction in brake pipe pressure, but instead, are moved to emergency position in which a passage 294 is uncovered. Fluid under pressure then flows from the valve chamber 159 and volume reservoir 161 through passage 294 to chamber 295 and operates piston 164 to unseat the vent valve 163, which quickly vents fluid from piston chamber 155 of the switch device 132 to the atmosphere by way of pipe and passage 156, passage 166, past the vent valve 163 to chamber 292 and from thence to the atmosphere through passage 293. The venting of fluid from the switch piston chamber 155, permits spring 153 to move the piston 149 downwardly and pull contact 148 out of engagement with contacts 150 and 151. This opens the circuit through train wire 206 connecting to magnet E on the locomotive, so that magnet E on the locomotive is deenergized.

Upon deenergization of magnet E on the locomotive, spring 60 unseats valve 59 which then supplies fluid at feed valve pressure from the feed valve pipe 216 through chamber 296 and past valve 59 to pipe 69 leading to piston chambers 101 and 68 of the vent valve devices 3 and 4, respectively. The vent valve 94 is unseated by the pressure of fluid in chamber 101 acting on piston 97 and opens the brake pipe to the atmosphere, and the vent valve 61 is operated by the pressure of fluid in chamber 68 acting on piston 62 to vent fluid from pipe 65, the operation of the vent valve devices 3 and 4 being the same as the vent valve device 133 on the remote unit.

The sudden reduction in brake pipe pressure causes the quick acting valve device 6 on the locomotive to operate in the same manner as the quick acting valve device 134 on the remote unit and as a result, the contact 102 of switch device 5 is moved out of engagement with contacts 104 and 105.

Pipe 65 on the locomotive being connected by means of pipe 91 to piston chamber 90 of the switch device 8 and to piston chamber 43 of the brake application valve device, fluid is suddenly vented from said chambers upon operation of the vent valve device 4.

The venting of fluid from piston chamber 90 of switch device 8 permits spring 93 to move contact 85 out of engagement with contacts 88 and 89, while the venting of fluid from the application piston chamber 43 permits the pressure of fluid in valve chamber 44 to move piston 42 and slide valve 45 to application position in which piston 42 engages a gasket 297.

The operation of the switch devices 8 and 5, the emergency magnet E, the vent valve devices 3 and 4 and the quick acting valve device 6 on the locomotive are not necessary when the engineer effects an emergency reduction in brake pipe pressure by moving the brake valve device to emergency position. Neither is the operation of the switch device 132 and quick acting valve device 134 on the remote unit necessary under this condition, but the operation of these devices under certain other conditions, which will be hereinafter described, is very necessary and desirable.

In order to charge the brake pipe and effect a release of the brakes after an emergency application, the brake valve device is operated in the same manner as in charging the brake pipe after a service reduction in brake pipe pressure. It is also necessary, however, to depress the reset switch device 9 and thereby locally close the circuit through magnet E on the locomotive, which circuit is normally controlled by the switch device 132 on the remote unit. The consequent energization of magnet E on the locomotive cuts off the supply of fluid under pressure to the vent valve devices 3 and 4 after which the fluid in the vent valve piston chamber 101 equalizes through port 248 in the piston 97 with atmospheric pressure in chamber 99 and permits spring 98 to seat the vent valve 94. Likewise, fluid under pressure in the vent valve piston chamber 68 equalizes through port 249 in the piston 62 with the atmospheric pressure in chamber 66 and permits spring 63 to seat valve 61.

With the vent valve 61 seated, the flow of fluid under pressure through port 220 in the brake application valve piston 42 builds up a pressure in piston chamber 43, in vent valve chamber 64 and in piston chamber 90 of the switch device 8. When a predetermined pressure is obtained in piston chamber 43, spring 46 moves the piston 42 and slide valve inwardly to their normal position, and when sufficient pressure is obtained in piston chamber 90 of the switch device 8 to overcome spring 93, the piston 86 moves the contact 85 into engagement with contacts 88 and 89.

The operation of the switch device 8 just described connects battery 10 to the brake valve device and with the brake valve device in the release or running position, said battery is connected to the train wire 195 leading to magnet SR on the remote unit. The battery 10 is also connected to the train wire 197 leading to the magnet E on the remote unit and with the reset switch 9 on the locomotive closed, the circuit through said magnets is closed independently of the switch device 5 on the locomotive.

The energization of magnet E on the remote unit seats valve 146, thus cutting off the supply of fluid under pressure to the vent valve piston chamber 173. The pressure acting on the opposite sides of the vent valve piston 169 then equalizes through port 262 and permits spring 170 to seat valve 167 and permit the brake pipe to be charged.

The energization of magnet SR causes the service application and release valve device to operate in the same manner as hereinbefore described to supply fluid under pressure to the brake pipe and to the equalizing reservoir 179.

When the brake pipe pressure on the locomotive is increased to a predetermined degree, the switch device 5 is operated to connect contacts 104 and 105 thereby closing the circuit through the return wire 201 of magnets SR and E independently of the reset switch device 9. Also, when the brake pipe pressure in the remote unit is increased to a predetermined degree, the switch device 132 is operated to close the circuit through the locomotive magnet E independently of the reset switch device 9. After the switch device 5 on the locomotive and the switch device 132 on the remote unit are operated as just described, the operator may remove manual pressure from the reset switch device 9.

The quick acting valve device 6 on the locomotive and the corresponding device 134 on the remote unit are charged with fluid under pressure from the brake pipe in the same manner as in initially charging the train.

If the traffic conditions become unfavorable, magnet T is automatically deenergized, which permits spring 174 to seat valve 73 and cut off the supply of fluid under pressure from pipe 223 to chamber 82 at one side of the timing valve piston 78 and to the volume reservoir 84. The seating movement of valve 73 unseats valve 72 past which fluid under pressure is vented from chamber 82 and volume reservoir 84 by way of passage 83, through a restriction 298 to passage 226 and from thence through chamber 225, past the valve 72 and to the atmosphere through passage 299 and a choke plug 300. The whistle pipe 76 is connected to passage 299 and the choke plug 300 is adapted to cause fluid under pressure to flow from passage 299 to pipe 76 and from thence through the whistle 75 to sound an alarm, so that the engineer will know of the change in traffic conditions.

When the pressure of fluid in chamber 82 acting on the valve piston 78 is thus reduced to a predetermined degree, spring 230 moves the valve piston 78 out of engagement with gasket 237, thereby opening passage 229 to chamber 80. Fluid under pressure is then quickly vented from chamber 82 through passage 229 to chamber 80. The consequent reduction in pressure in chamber 82 and increase in pressure in chamber 80 permits spring 230 to promptly move the valve piston to its lower position into engagement with gasket 301. As the valve piston 78 is moved to its lower position, spring 79 unseats valve 77 which permits fluid to be vented from the brake application valve piston chamber 43 and from piston chamber 90 of the switch device 8.

Upon the venting of fluid under pressure from piston chamber 43, the pressure in chamber 44 moves the piston 42 and slide valve 45 to application position in which piston 42 engages gasket 297.

In application position of the brake application valve device, fluid under pressure is vented from the cut off valve piston chamber 53 through passage 241, cavity 302 in the application slide valve 45 and atmospheric passage 303. This permits feed valve pressure in chamber 52 acting on the opposite side of the cut off valve piston 48 to move said piston outwardly against spring 54 and pull the valve 47 into engagement with seat rib 50, thereby closing the communication through which fluid is supplied from the feed valve device 215 to the brake pipe 40.

Passage 36, which communicates with the equalizing discharge valve piston chamber 35 and with the equalizing reservoir 37, is connected through cavity 236 in slide valve 45 to passage 244, which in turn is connected through passage and pipe 243 to the reduction limiting reservoir 242. Fluid is thus vented from piston chamber 35 and equalizing reservoir 37 to the reduction limiting reservoir and permits the equalizing discharge valve piston 34 to open the discharge valve 41 and effect a reduction in brake pipe pressure.

The venting of fluid from piston chamber 90 of the switch device 8, at the same time as fluid is vented from the application valve piston chamber 43, permits spring 93 to operate piston 86 and pull switch contact 85 out of engagement with contacts 88 and 89. This disconnects battery wires 193, 192 from the brake valve supply wire 194 which connects to finger 26 in the brake valve device, and as a result opens the circuit through magnet SR in the remote unit which then operates to effect a service reduction in brake pipe pressure in the same manner as hereinbefore described.

On the remote unit the reduction effected in equalizing reservoir pressure is limited to equalization of the pressure in the equalizing reservoir 179 into the reduction limiting reservoir 281, the degree of reduction effected, however, being sufficient to ensure a full service reduction in brake pipe pressure.

On the locomotive the reduction limiting reservoir 242 is open to the atmosphere through pipe and passage 243, passage 244, cavity 245 in the rotary valve 15 and atmospheric passage 246 when the brake valve device is in running position, so that if the brake valve device remains in running position the reduction limiting reservoir is ineffective and as a result, a complete venting of fluid from the equalizing reservoir 37, and consequently from the brake pipe, will occur. If, however, the engineer desires to limit the reduction in brake pipe pressure to a full service reduction and thereby prevent an unnecessary loss of fluid from the brake pipe, he may turn the brake valve device from running position, shown in the drawings, to service position in which passage 244 is lapped. The lapping of passage 244 prevents the escape of fluid vented to the reduction limiting reservoir 242, so that the pressure in the equalizing reservoir will only be reduced to equalization into the reduction limiting reservoir and the equalizing discharge valve mechanism will permit only a corresponding full service reduction in brake pipe pressure to occur.

When the traffic conditions change from unfavorable to favorable, magnet T on the locomotive is energized and the timing valve 77 is then seated in the manner hereinbefore described. This permits the supply of fluid through port 220 in the application valve piston to build up a pressure in the application piston chamber 43 and switch piston chamber 90 equal to the pressure in the application valve chamber 44, whereupon spring 46 returns the piston 42 and slide valve 45 to their normal position in which, with the brake valve in release and running position, the cut off valve device is operated to supply fluid under pressure to the brake pipe, the equalizing reservoir 37 is charged with fluid at brake pipe pressure and the reduction limiting reservoir is vented, in the manner hereinbefore described.

The operation of the switch device 8 by fluid supplied through the application valve device connects the battery 10 to the brake valve device and with the brake valve device in release or running position, the circuit is closed through magnet SR on the remote unit. Magnet SR is thereby energized and the application and release valve device 128 then operates in the same manner as hereinbefore described to charge the brake pipe 40 and equalizing reservoir 179 with fluid under pressure supplied by the feed valve device 265, and at the same time fluid under pressure is vented from the reduction limiting reservoir 281 through the magnet valve device 130 and service application and release valve device 128.

In effecting an emergency application of the brakes by operation of the brake valve device as hereinbefore described, the sudden reduction in brake pipe pressure is initiated at the head end of the train by operation of the brake valve device and simultaneously at the rear end of the train due to the deenergization of magnet E on the remote unit. It is desirable to thus start the brakes applying in emergency at both ends of the train in order to prevent harsh and damaging slack action between the cars in the train.

It has been explained how the deenergization of magnet E on the remote unit causes the switch device 132 to operate and open the circuit through magnet E on the locomotive and that operation of magnet E on the locomotive causes the switch device 5 to operate and open the circuit through magnet E on the remote unit. In other words, it will now be evident that the deenergization of either magnet E on the locomotive or magnet E on the remote unit from any cause, such as a broken train wire, will cause the other magnet E to become deenergized and as a consequence an emergency application of the brakes will be initiated simultaneously at both ends of the train.

If a sudden reduction in brake pipe pressure should be initiated in the train, due for instance to a burst brake pipe hose, the reduction is transmitted serially from car to car in both directions from the point of initiation in the usual manner. If the point of initiation should be near the middle of the train, the resultant slack action will not be excessive, but if the sudden reduction in brake pipe pressure should be initiated near either end of the train, damaging shocks might result with the usual pneumatic type of brake equipment. According to our invention, however, if the point of initiation is near the locomotive, then just as soon as the emergency rate of brake pipe reduction reaches the locomotive, the quick acting valve device 6 promptly operates to vent pipe 108 and switch piston chamber 107 so as to permit spring 110 to move switch contact 102 out of engagement with contacts 104 and 105 and thus open the circuit through magnet E on the remote unit. The consequent deenergization of magnet E on the remote unit supplies fluid under pressure to the vent valve device 133 causing said device to operate to initiate a sudden reduction in brake pipe pressure which is propagated serially from the rear end of the train forwardly in the train applying the brakes. Accordingly, the brakes at the rear end of the train are applied at substantially the same time as those at the front end of the train and as a result, the slack in the train is so controlled that damaging shocks are prevented.

The operation of the switch device 5 on the locomotive to open the circuit through magnet E on the remote unit by breaking the return wire 201 also causes deenergization of magnet SR and the consequent operation of the service application and release valve device 128 to cut off the supply of fluid under pressure to the brake pipe 40 at the rear of the train.

The switch device 132 on the remote unit operates upon the sudden reduction in brake pipe pressure at the remote unit to open the circuit through magnet E on the locomotive. Magnet E on the locomotive is consequently deenergized and supplies fluid under pressure to operate the vent valve devices 3 and 4, but since the brake pipe is already vented on the locomotive, the operation of the vent valve device 3 is unnecessary, but the operation of the vent valve device 4 is necessary in order to cause the brake application valve piston 42 to move the slide valve 45 to application position in which the cut-off valve device is operated to cut off the supply of fluid under pressure to the brake pipe at the head end of the train.

If the sudden reduction in brake pipe pressure, due possibly to a burst brake pipe hose, is initiated near the rear end of the train, the quick acting valve device 134 on the remote unit operates to vent piston chamber 155 of the switch device 132. Spring 154 then moves piston 149 and pulls the contact 148 out of engagement with contacts 150 and 151 thereby opening the circuit through magnet E on the locomotive. Magnet E on the locomotive is thus deenergized and causes the vent valve device 3 to operate and initiate an emergency reduction in brake pipe pressure at the head end of the train. The vent valve device 4 is operated at the same time as the vent valve device 3 to vent fluid under pressure from the brake application valve piston chamber 46 to cause the brake application valve to operate and cut off the supply of fluid under pressure to the brake pipe at the head end of the train, and also to cause the switch device 8 to operate and cut off the supply of current to magnet SR on the remote unit. The consequent deenergization of magnet SR then causes the service application and release valve device to operate and cut off the supply of fluid under pressure to the brake pipe at the rear end of the train.

In the manner just described, the quick acting valve device 6 on the locomotive will automatically operate, if a sudden venting of the brake pipe is initiated near the front of the train to start a sudden reduction in brake pipe pressure at the rear end of the train and also to cut off the supply of fluid under pressure to the brake pipe at both ends of the train, while if the sudden reduction in brake pipe pressure is near the rear of the train the quick acting valve device 134 on the remote unit will respond and initiate a sudden reduction in brake pipe pressure at the front of the train and cause the supply of fluid under pressure to the brake pipe at both ends of the train to be cut off.

It will be evident, that if any wire in the circuit of magnet E on the locomotive or magnet E on the remote unit becomes broken, or if the electric power is lost, an emergency application of the brakes will be initiated at both ends of the train. It will further be evident that neither magnet E on the locomotive or magnet E on the remote unit can be shorted without causing an emergency application of the brakes being effected. The energization of magnet E on the locomotive indicates to the engineer the integrity of the emergency brake circuits through the entire train, since the energization of said magnet is controlled by the energization of magnet E on the remote unit. Likewise since the energization of magnet E on the remote unit is controlled by magnet E on the locomotive the integrity of the emergency magnet circuits is indicated on the remote unit to the trainmen.

It will be noted that the choked coupling or plug 251 is interposed between the quick acting valve device 6 on the locomotive and the brake pipe 40. The purpose of this choked coupling is to so restrict the flow of fluid from the brake pipe to the pipe 108 that the pressure in pipe 108 and switch piston chamber 107 can be vented by the quick acting valve device 6 in the shortest possible time without material interference by the inrush of fluid to pipe 108 from the brake pipe. The flow area of the passage through the choked coupling 251 is, however, sufficiently great to permit an emergency rate of reduction in brake pipe pressure to be transmitted from the brake pipe 40 to piston chamber 111 of the quick acting valve device for causing same to operate. The choked coupling 273 is provided between brake pipe 40 and the quick acting valve device 134 on the remote unit for the same purpose.

If for any reason, such as a failure of electric power or a broken pipe, it becomes impossible to control the train brakes through the electric means provided on the locomotive and remote unit, then the cause of failure must be either rectified before the brakes can be released or the electric means on both the locomotive and remote unit must be cut out of operation, after which the brakes may be released and controlled pneumatically from the locomotive in the usual manner.

In order to render the electric brake means on the locomotive ineffective, a cock 305 is provided in the feed valve pipe 216 connecting to the emergency magnet valve device 2. The cock 305 comprises a plug valve 306 and a handle 307 for turning said plug valve from the normal cut-in position shown in the drawings, to a cut-out position. In the cut-out position the supply of fluid to the emergency magnet valve device 2 is cut off, so that even though the magnet E may be deenergized it is rendered ineffective to cause operation of the vent valve devices 3 and 4. If the vent valves 94 and 61 are open, then turning cock 305 to cut-out position cuts off the supply of fluid under pressure to the vent valve piston chambers 101 and 68. The fluid pressures then equalize on opposite sides of the vent valve pistons 97 and 62, which permits spring 98 to seat the vent valve 94 and spring 63 to seat the vent valve 61.

The seating of vent valve 61 permits charging of the brake application valve piston chamber 43, assuming the train to be in a territory where the brakes are automatically controlled by traffic conditions and the traffic conditions are favorable. The brake application valve parts then are returned to their normal position in which the brake pipe is charged with fluid under pressure through the brake valve device and the brakes are consequently released in the usual manner.

On the remote unit, a cock 308 is provided in the brake pipe branch pipe 270 and main reservoir pipe 264, said cock comprising a plug valve 309 having a handle 310 for turning said plug valve from the cut-in position shown in the drawing to a cut-out position in which communication through pipes 270 and 264 is interrupted, so that if for any reason magnet SR or E or the valve device 128 should be inoperative, or if a control pipe should be broken, the remote unit can be cut off from the brake pipe and, therefore, have no control over the pressure of fluid in the brake pipe.

By thus disconnecting the remote unit from the brake pipe, the brake pipe must be charged with fluid under pressure from the brake valve device on the locomotive, and the brake pipe pressure must be reduced through operation of said brake valve device in the usual manner. The resultant, purely pneumatic control of the train brakes from the locomotive is not provided as a substitute for the electrical control, but merely to permit an engineer to operate a train until he can reach a terminal where the damage or cause of failure can be repaired.

When the electric brake control is cut out of operation as above described, it will be noted that the traffic controlled means are still operative to effect a service application of the brakes in case the traffic conditions become unfavorable. The operation of the switch device 8 will, however, be ineffective to cause a service application of the brakes to be simultaneously effected at the rear of the train, if the train brakes are applied due to a change in traffic conditions, so that the brake application will be effected entirely from the front end of the train.

If at any time the train is operating in territory where there is no provision for the control of train brakes by traffic conditions, the traffic controlled magnet T will be deenergized. However, in order to prevent the deenergization of said magnet from interfering with the control of the train brakes either electrically or pneumatically, as hereinbefore described, a cock 311 is interposed in pipe 221. The cock 311 comprises a plug valve 312 and a handle 313 for turning said plug valve from the cut-in position shown in the drawing to a cut-out position in which communication to the traffic controlled means 7 is closed, so that the brake application valve will still be controlled by the operation of magnet E through the vent valve device 4. In case of failure of the electric brake control mechanism in territory where there is no provision for control of train brakes by traffic conditions, both cocks 305 and 311 will be turned to cut-out position so that the brake application valve will be maintained in its normal position so as to permit pneumatic control of the train brakes from the brake valve device in the manner hereinbefore described.

In the above description of operation it was assumed that the special car employing our remote controlling unit was placed at the rear end of the train on a special car such as the cabin car, and by employing the unit on the cabin car the time required to effect a service application, an emergency application, and a release of the brakes was reduced to about 50% of that required when using only the brake valve device on the locomotive. It has been found that the application and release times can be still further reduced if the special car is placed in the train for instance two-thirds of the distance back from the locomotive, for the apparent reason that fluid supplied to or vented from the brake pipe by the brake valve device on the locomotive and by the application and release valve device on the remote unit does not have to flow through the brake pipe for as great a distance as when the remote unit is placed at the rear end of the train.

Whether or not one special car equipped with the remote controlling unit will be sufficient to properly control the train brakes in conjunction with the locomotive brake equipment depends primarily upon the length of the train and the time permitted for applying and releasing the brakes so as not to obtain damaging shocks. With the operating times fixed, the number of remote units required for obtaining said times may be determined by the length of the train and then spaced through the train.

When a number of the remote units are distributed through the train, it will be evident that the magnets SR, L and E on all of said remote units will be connected in parallel and will, therefore, operate simultaneously. It will further be noted that since the train wire connecter 208 is used only on the rearmost special car to connect train wires 201 and 206, the emergency switch devices 132 on all of the remote units will be arranged serially in the train wire 206, so that the operation of any one of said switches in the train will open the circuit through the emergency magnet E on the locomotive and hence initiate an emergency application of the brakes on each special car in the train.

In Fig. 7 our improved means for controlling the operation of the remote brake controlling units, shown in Fig. 2, is shown associated with a locomotive which is not equipped for control by changes in traffic conditions.

In the apparatus shown in Fig. 7, the switch device 8 and the brake application valve device are controlled directly by magnet E which operates upon deenergization to directly vent fluid under pressure from both of said devices instead of supplying fluid under pressure to vent valve devices as in the construction shown in Fig. 1.

Switch 8 operates upon the venting of fluid therefrom in the same manner as described in connection with the brake equipment shown in Fig. 1. The operation of the brake application valve device causes the cut-off valve to operate to cut off the supply of fluid to the brake pipe, also the slide valve 188 of said device is provided with a cavity 314 adapted when the slide valve is moved to application position to connect a passage 315 to a passage 316. Passage 315 communicates with the brake pipe discharge valve chamber 38, and passage 316 connects with passage 287 leading to the vent valve piston chamber 288, so that fluid under pressure is permitted to flow from the brake pipe to said piston chamber. Since passage 287 is lapped by the brake valve rotary valve at a time when the brakes will be applied by operation of magnet E, fluid supplied to chamber 288 builds up a pressure on piston 57 and operates said piston to unseat the vent valve 55 and thereby initiate a sudden emergency reduction in brake pipe pressure at the locomotive. The actuating fluid supplied to the vent valve piston chamber 288 reduces as the brake pipe pressure is vented and when reduced to a predetermined low degree, spring 58 seats the vent valve 55 so as to permit the brake pipe to be charged when desired after the energization of magnet E and the return of the brake application valve piston 185 and slide valve 188 to their normal position.

With the brake application valve device in its normal position, if the engineer desires to effect an emergency application of the brakes, he turns the brake valve device to emergency position, in which fluid at main reservoir pressure is supplied from rotary valve chamber to passage 287 and from thence to the vent valve piston chamber 288 for operating the piston 57 to unseat the vent valve 55.

In order to effect a release of the brakes after an emergency application effected by operating the brake valve device, the brake valve device is turned to release or running position in both of which the supply of fluid to the vent valve piston chamber 288 is cut off. This permits the pressure in chamber 288 to bleed down through the exhaust port 317 in the vent valve piston, following which spring 58 seats the vent valve 55 and permits the brake pipe to be charged with fluid under pressure to effect a release of the brakes.

A plug valve 318 is provided to control communication through passage and pipe 319 connecting the brake application valve piston chamber 186 to magnet E and is normally carried in the cut-in position shown in the drawings, so that said communication is open. If the electrical control apparatus should fail however, or if for any reason it should be desired to render the electrical control apparatus ineffective, the plug valve 318 may be turned from cut-in position to a cut-out position by means of a handle 320. In cut-out position the application valve piston chamber is disconnected from magnet E, so that the brake application valve device is maintained in the normal position shown in the drawings, and the brakes will then respond only to variations in brake pipe pressure effected through operation of the brake valve device.

Briefly, it will be noted that when operating a train, the circuit through magnet E on the locomotive is controlled only by the switch device 132 on the one or remote units, so that if said switch device is operated by a sudden reduction in brake pipe pressure on a remote unit, the circuit through magnet E on the locomotive is opened. The consequent deenergization of magnet E initiates an emergency reduction in brake pipe pressure at the locomotive, cuts off the supply of fluid to the brake pipe at the locomotive and opens the circuits through magnets SR and E on the one or more remote units, the consequent deenergization of magnet SR cutting off the supply of fluid under pressure to the brake pipe at the remote unit. If there are more than one remote units in the train, the switches 148 of the switch devices 132 are connected serially into the train wire 206, so that the operation of any one of said switches opens the circuit through magnet E on the locomotive.

The circuit through magnet E on the one or more remote units is controlled by the brake valve device and by the switch device 5 on the locomotive. The brake valve control of said magnet is for manually initiating an emergency reduction in brake pipe pressure at the one or more remote units simultaneously with the initiation of an emergency reduction in brake pipe pressure at the locomotive. The switch device 5 on the locomotive is provided to respond to a burst hose or the like and open the circuit through magnets E and SR on the one or more remote units, so as to cut off the supply of fluid to the brake pipe and initiate an emergency reduction in brake pipe pressure at the remote unit or units. Magnet E on the locomotive remains energized until the switch device 132 on a remote unit responds to the emergency reduction in brake pipe pressure, at which time magnet E in the locomotive is deenergized and operates to cut off the supply of fluid to the brake pipe at the locomotive.

One purpose of switch device 8 on the locomotive is to open the circuit through magnet SR on the one or more remote units when the traffic controlled apparatus operates, so that a service application of the brakes will be simultaneously effected at the locomotive and at the one or more remote units. Another purpose of this switch device is to open the circuit through magnet SR on the one or more remote units so as to cut off the supply of fluid under pressure to the brake pipe when an emergency reduction in brake pipe pressure is initiated at the rear end of the train.

The brake valve device is provided with five movable contacts, three of which are connected by one bridge while the other two are connected by a separate bridge, the purpose being to prevent deenergization of magnet E on the one or more remote units when the switch device 8 is operated upon a change to unfavorable traffic conditions.

It will now be evident that we have provided improved means whereby the application and release of brakes in a long train may be effected with such dispatch as to effectively control the slack in the train and prevent damaging shocks. This means, which may be carried on a special vehicle or a control car, may be employed at one or more locations in the train and being controlled by the brake valve device on the locomotive is adapted to reproduce the functions of said brake valve device at the different locations in the train, thereby accelerating the application and release of the brakes on the whole train.

One very important feature is the provision of an emergency magnet valve device on the locomotive and an emergency magnet valve device on the one or more remote units, the circuit through the emergency magnet on the locomotive being controlled by the emergency magnet or magnets on the one or more remote units, while the circuit through the latter is controlled by the emergency magnet on the locomotive. These emergency magnet circuits are normally closed through the train wires extending between the locomotive and the one or more remote units, so that when the emergency magnet on the locomotive and the emergency magnet on the one or more remote units is energized, the engineer and trainmen are assured of the integrity of the emergency brake control on the train. If for any reason, such as a broken train wire, a loss of power, or a burst hose, the emergency magnet on the locomotive or that on the remote unit, or one of the remote units, in case more than one is employed in the train, should become deenergized, an emergency application of the brakes will be immediately initiated at the locomotive and at each of the one or more remote units, thereby assuring the safety of the train.

The electrical control apparatus on the locomotive and one or more units is responsive to brake valve operation as well as to changes in traffic conditions and means are provided for cutting out the traffic condition control if desirable. Means are also provided for cutting out the electrical control if necessary, so that the train brakes can only be controlled from the locomotive by the brake valve or by changes in traffic conditions. If necessary both the traffic condition control and electrical control may be cut out, in which case the train brakes can only be controlled by the brake valve device on the locomotive.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In a fluid pressure train brake system, the combination with a brake pipe, a reduction in pressure in which operates to effect an application of the brakes, of valve means at one point in the train operative to effect a reduction in brake pipe pressure, a magnet operative upon deenergization to effect the operation of said valve means, a fluid pressure operated switch at another point in the train operative upon a reduction in pressure to effect the deenergization of said magnet, valve means connected to said brake pipe and to said switch device and operative upon a sudden rate of reduction in brake pipe pressure to vent fluid under pressure from said brake pipe and from said switch device, and means for restricting the venting of fluid from said brake pipe.

2. In a fluid pressure train brake system, the combination with a brake pipe, a reduction in pressure in which effects an application of the brakes and an increase in pressure in which effects a release of the brakes, of valve means on the locomotive for supplying fluid under pressure to said brake pipe and operative to cut off the supply of fluid to said brake pipe and vent fluid under pressure from said brake pipe, a magnet device operative upon deenergization to effect the operation of said valve means, pressure responsive means on a car in the train subject to the pressure of fluid in said brake pipe for normally closing a circuit through said magnet device and operative upon a reduction in brake pipe pressure to open said circuit to effect the deenergization of said magnet device, and manually operated means for closing the circuit through said magnet device independently of said pressure responsive means.

3. In a fluid pressure train brake system, the combination with a brake pipe, in which a reduction in pressure operates to effect an application of the brakes, of electro-responsive means on a car in the train operative upon deenergization to effect a reduction in brake pipe pressure, and means on the locomotive for controlling said electro-responsive means and operative to effect the deenergization of said electro-responsive means, said means comprising a switch device for normally closing a circuit through said electro-responsive means and operative to open said circuit, and valve means subject to brake pipe pressure and operative upon a reduction in brake pipe pressure to effect the operation of said switch device.

4. In a fluid pressure train brake system, the combination with a brake pipe from which fluid under pressure is vented to effect an application of the brakes and to which fluid under pressure is supplied to effect a release of the brakes after an application, of electro-responsive means on a car of the train operative upon deenergization to vent fluid under pressure from said brake pipe and operative upon energization to supply fluid under pressure to said brake pipe, of means on the locomotive operative upon a reduction in brake pipe pressure to effect the deenergization of said electro-responsive means, and a manually operated switch device on the locomotive for shunting said means to effect the energization of said electro-responsive means.

5. In a fluid pressure train brake system, the combination with a brake pipe to which the supply of fluid under pressure is cut off and from which fluid under pressure is vented in effecting an application of the brakes, of electro-responsive means on a car of the train operative upon deenergization to cut off the supply of fluid under pressure to the brake pipe and to vent fluid under pressure from the brake pipe, electro-responsive means on the locomotive operative upon deenergization to cut off the supply of fluid under pressure to the brake pipe at the locomotive, and means on the locomotive subject to fluid under pressure from the brake pipe and operative upon a reduction in brake pipe pressure at the locomotive for effecting the deenergization of said electro-responsive means on the car and on the locomotive.

6. In a fluid pressure train brake system, the combination with a brake pipe to which the supply of fluid under pressure is cut off and from which fluid under pressure is vented in effecting an application of the brakes, of electro-responsive means on the locomotive for supplying fluid under pressure to the brake pipe and operative to cut off the supply of fluid under pressure to said brake pipe and to effect a reduction in brake pipe pressure, electro-responsive means on a car of the train for supplying fluid under pressure to said brake pipe and operative to cut off the supply of fluid under pressure to said brake pipe, means on the car of the train operative upon a reduction in brake pipe pressure to effect the operation of the electro-responsive means on the locomotive, and means on the locomotive for effecting the operation of the electro-responsive means on the car, the last mentioned means being operative upon the reduction in brake pipe pressure effected by operation of the electro-responsive means on the locomotive.

7. In a fluid pressure train brake system, the combination with a brake pipe to which the supply of fluid under pressure is cut off and from which fluid under pressure is vented to effect an application of the brakes, of electro-responsive means at one point in the train operative to cut off the supply of fluid under pressure to said brake pipe and to vent fluid under pressure from the brake pipe, and means at another point in the train responsive to a reduction in brake pipe pressure for effecting the operation of said electro-responsive means.

8. In a fluid pressure train brake system, the combination with a brake pipe to which the supply of fluid under pressure is cut off and from which fluid under pressure is vented to effect an application of the brakes, of electro-responsive means at one point in the train operative to cut off the supply of fluid under pressure to said brake pipe and to vent fluid under pressure from the brake pipe, means at another point in the train responsive to a reduction in brake pipe pressure for effecting the operation of said electro-responsive means, and electro-responsive means at the second mentioned point in the train for supplying fluid under pressure to the brake pipe and operative to cut off said supply upon operation of the first mentioned electro-responsive means.

9. In a fluid pressure train brake system, the combination with a brake pipe from which fluid under pressure is vented to effect an application of the brakes, of means for effecting a reduction in brake pipe pressure at one point in the train when a reduction in brake pipe pressure is effected at another point in the train, said means comprising electro-responsive means at both points in the train operative to vent fluid under pressure from the brake pipe, a switch device at the first mentioned point in the train responsive to a reduction in brake pipe pressure to effect the operation of the electro-responsive means at the other point in the train, and a switch device at the second mentioned point in the train responsive to a reduction in brake pipe pressure to effect the operation of the electro-responsive means at the first mentioned point in the train.

10. In a fluid pressure train brake system, the combination with a brake pipe from which fluid under pressure is vented for effecting an application of the brakes and to which fluid under pressure is supplied to effect a release of the brakes after an application, of electro-responsive means on the locomotive and on a car of the train, both of said means being operative upon energization to supply fluid under pressure to the brake pipe and operative upon deenergization to cut off the supply of fluid under pressure to the brake pipe and to vent fluid under pressure from the brake pipe, a switch device on the locomotive operated by fluid under pressure from the brake pipe for closing a circuit through the electro-responsive means on the car and operative upon a reduction in brake pipe pressure to open said circuit for deenergizing the electro-responsive means on the car, a switch device on the car operated by fluid under pressure from the brake pipe for closing a circuit through the electro-responsive means on the locomotive and operative upon a reduction in brake pipe pressure to open said circuit for deenergizing the electro-responsive means on the locomotive, and a manually operated switch device on the locomotive for shunting both of the above mentioned switch devices.

11. In a fluid pressure train brake system, the combination with a brake pipe to which fluid under pressure is supplied for effecting a release of the brakes, a main reservoir and a feed valve device connected to said main reservoir on the locomotive, an engineer's brake valve device having a release position for establishing a communication through which fluid under pressure is supplied from said main reservoir to said brake pipe and a running position for establishing a communication through which fluid under pressure is supplied from said feed valve device to said brake pipe, a main reservoir and a feed valve device connected to the main reservoir on a car, and means on the car controlled by the brake valve device for establishing a communication through which fluid under pressure is supplied from the feed valve device to the brake pipe when the brake valve device is in release and running position.

12. In a fluid pressure train brake system, the combination with a brake pipe from which fluid under pressure is vented to effect an application of the brakes and to which fluid under pressure is supplied to effect a release of the brakes, of a service-release magnet on a car in the train, valve means on said car operative upon energization of said magnet to supply fluid under pressure to the brake pipe and upon deenergization of said magnet to vent fluid under pressure from said brake pipe at a service rate, an emergency magnet on said car, valve means operative upon deenergization of said emergency magnet to effect an emergency reduction in brake pipe pressure, a brake valve device on the locomotive for controlling the magnets on the car and having a running position for energizing both of said magnets and for supplying fluid under pressure to the brake pipe at the locomotive, a service position for deenergizing the service-release magnet and for effecting a service reduction in brake pipe pressure at the locomotive, and an emergency position for deenergizing both of said magnets and for venting fluid under pressure from the brake pipe at the locomotive at an emergency rate, a switch device operative when the brake valve device is in running position for deenergizing the service-release magnet, valve means on the locomotive operative to cut off the supply of fluid under pressure to the brake pipe and vent fluid under pressure from said brake pipe at a service rate, and means operative upon a change in traffic conditions for effecting the operation of said switch device and said valve means.

13. In a fluid pressure train brake, the combination with a brake pipe, of a brake valve device on the locomotive operative to effect a service reduction in brake pipe pressure, means on a car controlled at one time by said brake valve device and operative simultaneously to effect a service reduction in brake pipe pressure, valve means on the locomotive operative independently of said brake valve device for effecting a service reduction in brake pipe pressure, traffic controlled means operative when the traffic conditions become unfavorable to effect the operation of said valve means, and means responsive to the operation of said traffic controlled means to effect the operation of the means on the car simultaneously with the operation of said valve means.

14. In a fluid pressure train brake, the combination with a brake pipe, of a brake valve device on the locomotive operative to effect a service reduction in brake pipe pressure, means on a car controlled at one time by said brake valve device and operative simultaneously to effect a service reduction in brake pipe pressure, valve means on the locomotive operative independently of said brake valve device for effecting a service reduction in brake pipe pressure, traffic controlled means operative when the traffic conditions become unfavorable to effect the operation of said valve means, pressure sensitive means responsive to the operation of said traffic controlled means to effect the operation of the means on the car, and a cut-out device for rendering said valve means and said pressure sensitive means nonresponsive to the operation of said traffic controlled means.

15. In a fluid pressure train brake, the combination with a brake pipe, of a brake valve device on the locomotive operative to effect a service reduction in brake pipe pressure, means on a car controlled at one time by said brake valve device and operative simultaneously to effect a service reduction in brake pipe pressure, valve means on the locomotive operative independently of said brake valve device for effecting a service reduction in brake pipe pressure, traffic controlled means operative when the traffic conditions become unfavorable to effect the operation of said valve means, pressure sensitive means responsive to the operation of said traffic controlled means to effect the operation of the means on the car, and a cut-out device for rendering the means on the car inoperative to effect a reduction in brake pipe pressure.

16. In a fluid pressure train brake system, the combination with a brake pipe, of a brake valve device on the locomotive for effecting a service reduction in brake pipe pressure, an emergency reduction in brake pipe pressure and for supplying fluid under pressure to said brake pipe for effecting a release of the brakes after an application, brake control means on a car of the train controlled from said brake valve device and operative in accordance with the operation of said brake valve device to duplicate the functions of said brake valve device, said brake control means comprising an emergency magnet device for effecting a sudden reduction in brake pipe pressure, a switch device on the locomotive for controlling said emergency magnet device independently of said brake valve device, said switch device being subject to fluid under pressure from the brake pipe and operative upon a reduction in brake pipe pressure to effect the operation of said emergency magnet device, magnet controlled means on the locomotive operative upon the operation of said switch device to cut off the supply of fluid under pressure to the brake pipe through said brake valve device and to open the brake pipe to the atmosphere, a switch device on the car responsive to a reduction in brake pipe pressure for also effecting the operation of the magnet controlled means on the locomotive, means on the car for rendering said brake control means and the car switch device ineffective, and means on the locomotive for rendering the magnet controlled means ineffective.

17. In a fluid pressure train brake system, the combination with a brake pipe in which a reduction in pressure operates to effect an application of the brakes and in which an increase in pressure operates to effect a release of the brakes, of valve means for normally effecting an increase in brake pipe pressure and operative to cut off the supply of fluid under pressure to said brake pipe, vent valve means for effecting the operation of said valve means and for venting fluid under pressure from said brake pipe, electro-responsive means on the locomotive operative to effect the operation of said vent valve means, and pressure sensitive means subject to the pressure of fluid in the brake pipe on a car of the train for controlling said electro-responsive means, said pressure sensitive means being operative upon a reduction in brake pipe pressure to effect the operation of said electro-responsive means.

18. In a fluid pressure train brake system, the combination with a brake pipe in which a reduction in pressure operates to effect an application of the brakes and in which an increase in pressure operates to effect a release of the brakes, of valve means for normally effecting an increase in brake pipe pressure and operative to cut off the supply of fluid under pressure to said brake pipe and effect a reduction in brake pipe pressure at a service rate, vent valve means for effecting the operation of said valve means, electro-responsive means on the locomotive operative to effect the operation of said vent valve means, means on a car of the train subject to the pressure of fluid in the brake pipe and operative upon a reduction in brake pipe pressure to effect the operation of said vent valve means, and traffic controlled means automatically operative when the traffic conditions become unfavorable to effect the operation of said valve means.

19. In a fluid pressure train brake system, the combination with a brake pipe in which a reduction in pressure operates to effect an application of the brakes and in which an increase in pressure operates to effect a release of the brakes, of valve means for normally effecting an increase in brake pipe pressure and operative to cut off the supply of fluid under pressure to said brake pipe and effect a reduction in brake pipe pressure at a service rate, vent valve means for effecting the operation of said valve means and for venting fluid under pressure from said brake pipe at an emergency rate, electro-responsive means on the locomotive operative to effect the operation of said vent valve means, means on a car of the train subject to the pressure of fluid in the brake pipe and operative upon a reduction in brake pipe pressure to effect the operation of said vent valve means, and traffic controlled means automatically operative when the traffic conditions become unfavorable to effect the operation of said valve means.

20. In a fluid pressure train brake system, the combination with a brake pipe, in which a reduction in pressure operates to effect an application of the brakes and in which an increase in brake pipe pressure operates to effect a release of the brakes of vent valve means on the locomotive for venting fluid under pressure from the brake pipe, an engineer's brake valve device operative to cut off the supply of fluid under pressure to the brake pipe and to effect the operation of said vent valve means, a valve device for controlling the supply of fluid under pressure to said brake pipe and operative to cut off said supply and effect the operation of said vent valve means, means comprising a magnet operative upon deenergization to effect the operation of said valve device and a switch device on a car of the train operative upon a reduction in brake pipe pressure to effect the deenergization of said magnet.

RAYMOND E. MILLER.
THOMAS W. MASTERMAN.